United States Patent
Dan et al.

(10) Patent No.: US 9,753,946 B2
(45) Date of Patent: Sep. 5, 2017

(54) REVERSE IP DATABASES USING DATA INDICATIVE OF USER LOCATION

(71) Applicant: Microsoft Technology Licensing, LLC., Redmond, WA (US)

(72) Inventors: Ovidiu Dan, Kirkland, WA (US); Vaibhav Parikh, Bothell, WA (US); Siddhartha Cingh Arora, Redmond, WA (US); Ryan Clark, King County, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 346 days.

(21) Appl. No.: 14/332,350

(22) Filed: Jul. 15, 2014

(65) Prior Publication Data
US 2016/0019237 A1    Jan. 21, 2016

(51) Int. Cl.
*G06F 17/30* (2006.01)
*H04L 29/12* (2006.01)

(52) U.S. Cl.
CPC .... *G06F 17/30241* (2013.01); *G06F 17/3087* (2013.01); *G06F 17/30345* (2013.01); *G06F 17/30864* (2013.01); *G06F 17/30876* (2013.01); *H04L 61/2007* (2013.01)

(58) Field of Classification Search
CPC ........................ G06F 17/3087; H04L 61/2007
USPC ......................................................... 707/695
See application file for complete search history.

(56) References Cited

U.S. PATENT DOCUMENTS

| | | | |
|---|---|---|---|
| 7,424,472 B2 | 9/2008 | Wang et al. | |
| 7,797,410 B2 | 9/2010 | Westerdal | |
| 8,694,499 B1 | 4/2014 | Baluja et al. | |
| 9,026,145 B1 * | 5/2015 | Duleba | H04L 61/25 455/456.3 |
| 9,197,595 B1 * | 11/2015 | Sandler | H04L 67/18 |
| 2002/0087666 A1 * | 7/2002 | Huffman | H04L 29/12009 709/220 |
| 2003/0074471 A1 * | 4/2003 | Anderson | H04L 29/12009 709/245 |
| 2006/0218114 A1 | 9/2006 | Weare et al. | |

(Continued)

OTHER PUBLICATIONS

Article entitled "Mining Checkins from Location-sharing Services for Client-independent IP Geolocation", dated Apr. 27, 2014.*

(Continued)

*Primary Examiner* — Mahesh Dwivedi

(57) ABSTRACT

Architecture that improves the quality of RevIP databases using search engine query logs and other location information sources and finds IP addresses that share multiple locations (indicative of large Internet gateways). A ground truth dataset is generated with mappings of IP addresses to locations and IP ranges to locations which are known to be correct. Additionally, the architecture can determine which types of queries and SERP page blocks (page sections) are location aware. Location information can be extracted from user queries and the most-frequently-used locations aggregated per IP address. Dominant locations can be aggregated, mapped to existing RevIP database IP address ranges and replaced. The updated RevIP database can be evaluated against the ground truth dataset. RevIP IP address ranges can be split and combined to improve the overall performance of the RevIP database.

17 Claims, 8 Drawing Sheets

(56) References Cited

U.S. PATENT DOCUMENTS

| | | | |
|---|---|---|---|
| 2007/0133385 A1 | 6/2007 | Hoek et al. | |
| 2008/0059310 A1 | 3/2008 | Lettow et al. | |
| 2009/0248663 A1 | 10/2009 | Maniyar et al. | |
| 2011/0098917 A1* | 4/2011 | LeBeau | G01C 21/265 701/533 |
| 2011/0153681 A1* | 6/2011 | Peng | H04L 29/12047 707/803 |
| 2011/0225192 A1 | 9/2011 | Imig et al. | |
| 2012/0072287 A1 | 3/2012 | Crane et al. | |
| 2012/0317104 A1 | 12/2012 | Radlinski et al. | |
| 2013/0046879 A1 | 2/2013 | Garcia et al. | |
| 2013/0159804 A1 | 6/2013 | Suzue et al. | |
| 2014/0164415 A1* | 6/2014 | Duleba | G06F 17/30241 707/758 |
| 2016/0006628 A1* | 1/2016 | Herring | H04L 41/0618 709/224 |

OTHER PUBLICATIONS

Article entitled "Splitting an IP address Range, IP addresses stop after 210937 records", dated Apr. 9, 2013.*

Article entitled "A Geolocation Databases Study", by Shavitt et al., dated Dec. 2011.*

Article entitled "IP Geolocation Databases: Unreliable?", by Poese et al., dated Apr. 2011.*

"International Search Report and Written Opinion Issued in PCT Application No. PCT/US2015/039632", Mailed Date: Oct. 14, 2015, 10 Pages.

Hao, et al., "Mining Checkins from Location-Sharing Services for Client-Independent IP Geolocation", In Proceedings of the IEEE Conference on Computer Communications, Apr. 27, 2014, pp. 619-627.

Maziku, et al., "Enhancing the Classification Accuracy of IP Geolocation", In Proceedings of the Military Communications Conference, Oct. 29, 2012, 6 Pages.

Taylor, et al., "Bringing Location to IP Addresses with IP Geolocation", In Journal of Emerging Technologies in Web Intelligence, vol. 4, No. 3, Aug. 1, 2012, 5 Pages.

Krause, et al., "A Utility-Theoretic Approach to Privacy and Personalization", In Proceedings of the 23rd national conference on Artificial intelligence—vol. 2, Jul. 13, 2008, pp. 1181-1188.

"Second Written Opinion Issued in PCT Application No. PCT/US2015/039632", Mailed Date: May 31, 2016, 8 Pages.

"International Preliminary Report on Patentability Issued in PCT Application No. PCT/US2015/039632", Mailed Date: Sep. 16, 2016, 10 Pages.

* cited by examiner

REVERSE IP DATABASES USING DATA INDICATIVE OF USER LOCATION

BACKGROUND

Search engines oftentimes use the location of the user to customize the results shown on the results page. For instance, for a query of "weather", the search engine may use the geographical location of the user to display the weather forecast based on the location context of the user.

One approach for determining the location of a user is to use positioning systems such as GPS (global positioning system). Unfortunately, this information is not available for the majority of users, as the users need to use a device with GPS and would also need to enable the search engine access to this personal location information. Another approach to determine user location is to simply ask the user to self-report the user location. While this might be accurate in the short-term, in the long-term the user might relocate to new location without updating the self-reported location. Yet another approach employed to overcome the limitations above is to consult a Reverse IP database ("RevIP"). This database contains ranges of IP addresses and their corresponding location.

Unfortunately, self-reported performance numbers of commercial RevIP databases reveal that the precision and coverage of these databases are lacking. Attempts to solve this problem exploit the structure of Internet backbone links and measure the time to reach different parts of the Internet. However, these attempts have had only limited success. Finding ways to improve these databases presents a significant challenge and a solution to which can provide a positive financial impact for companies across several industries.

SUMMARY

The following presents a simplified summary in order to provide a basic understanding of some novel implementations described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture improves the quality of RevIP databases using search engine query logs and finds IP addresses that share multiple locations (indicative of large Internet gateways). With respect to query logs, a ground truth dataset is generated with mappings of IP addresses to locations and IP ranges to locations which are known to be correct. An alternative solution can employ other location-derived data such as geographical social network "check-in" data. Additionally, the architecture can determine which types of queries and SERP page blocks (page sections) are location aware.

Location information can be extracted from user queries and the most-frequently-used locations aggregated per IP address. Dominant locations can be aggregated, mapped to existing RevIP IP address ranges, and replaced based on a decision algorithm. The modified RevIP database can be evaluated against a ground truth dataset. RevIP IP address ranges can be split and combined to improve the overall performance of the RevIP database. Moreover, finding IP addresses that share multiple locations is indicative of large Internet gateways.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
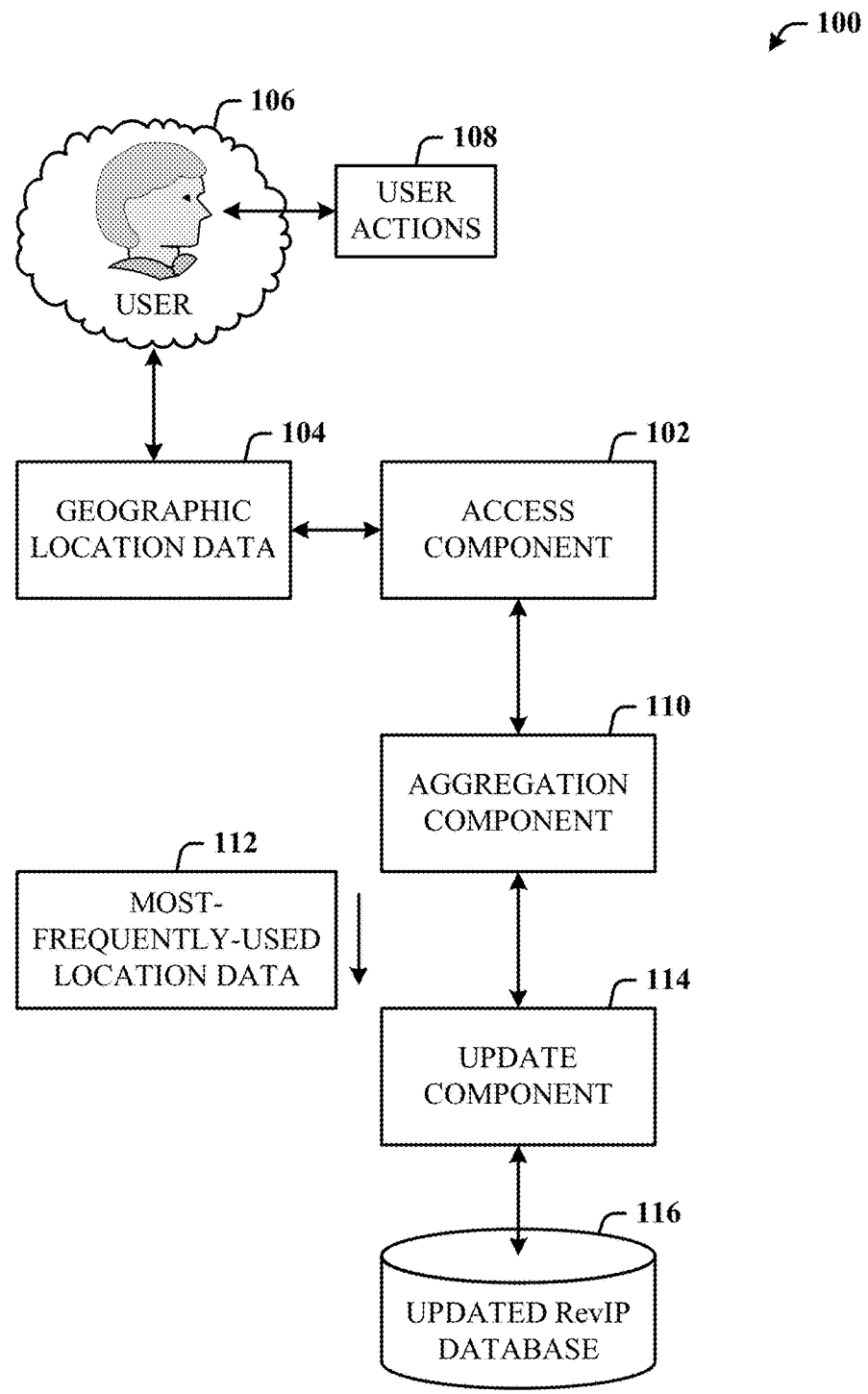
FIG. 1 illustrates a database update system in accordance with the disclosed architecture.

Search engines often use the geographic location of the user to customize the results shown on the page. For instance, for the query "weather" the search engine uses the location of the user to display the weather forecast based on the location context of the user. One precise way to determine the location of a user is to use positioning systems such as GPS (global positioning system); however, this information is not available for the majority of users. Another method employs simply prompting the user to self-report the location information, but self-reporting has its own problems.

In order to overcome limitations in the above approaches, the location of the user can be determined by consulting a reverse IP (Internet protocol) database ("RevIP"). The RevIP database contains ranges of IP addresses and corresponding location. When a user visits a search engine, the RevIP database is used to determine the most likely geographical location of the user. The granularity of RevIP databases varies, but can get down to the neighborhood or street level.

Accurate RevIP databases are employed with search engines and are utilized in a few types of page regions on the search engine result page (SERP), which make use of the location of the user: web search results ranking based on location (e.g., when a user searches for "DMV", the search engine should show web search result links to DMV (department of motor vehicle) offices which are geographically close to the user); local results (e.g., user searches for "thai restaurants"); local weather forecast (e.g., "weather forecast"); movies playing in a cinema close to the user (e.g., "movies playing near me"); personalized news based on location (e.g., "local news"); and, location-based advertising (e.g., "plumbers").

Reverse IP databases are also used extensively in other industries as well, such as for credit card fraud protection, content delivery networks, organizations with regional offices, and e-commerce, for example.

Financial institutions use the location of the user making an online financial transaction as one of the inputs in credit card fraud detection algorithms. Knowing the location of the online user enables the financial institution to flag transactions coming from certain countries which originate a high percentage of credit card fraud.

With respect to content delivery networks, in order to enable faster access to online content, these types of networks deploy servers in datacenters across the globe. Content delivery networks then use a RevIP database to determine the location of a user to direct the user to the geographically closest server which can serve the requested online content. This can result in savings both in terms of content latency, throughput, and bandwidth costs.

Organizations with regional offices (e.g., insurance companies, fast-food restaurants, non-governmental organizations, etc.) can use RevIP databases to customize websites and direct the user to the office geographically closest to the user. Additionally, e-commerce websites can customize prices to include the correct shipping charges depending on the location of the user.

Companies that publish commercial RevIP databases compile these databases by consulting organizations such as IANA (Internet Assigned Numbers Authority) and various national and local Internet registries, which are responsible for assigning IP ranges to organizations. Furthermore, the RevIP companies also contact individual ISPs (Internet service providers), which may further segment the IP address space to the region, city, and/or neighborhood levels.

Unfortunately, self-reported performance numbers of commercial RevIP databases reveal that the precision and coverage of these databases are lacking. Accordingly, finding ways to improve these databases is an important problem the solution to which can have significant positive financial impact for companies across several industries.

The disclosed architecture improves the quality of RevIP databases using search engine query logs and finds IP addresses that share multiple locations (indicative of large Internet gateways). With respect to query logs, a ground truth dataset is generated with mappings of IP addresses to locations and IP ranges to locations which are known to be correct. An alternative solution can employ other location-derived data such as geographical social network "check-in" data. Additionally, the architecture can determine which types of queries and SERP page blocks (page sections) are location aware.

Location information can be extracted from user queries and the most-frequently-used locations aggregated per IP address. Dominant locations can be aggregated, mapped to existing RevIP IP address ranges, and replaced based on a decision algorithm. The modified RevIP database can be evaluated against a ground truth dataset. RevIP IP address ranges can be split and combined to improve the overall performance of the RevIP database. Moreover, finding IP addresses that share multiple locations is indicative of large Internet gateways.

As used herein, an explicit location query is intended to mean search engine user queries that contain locations, such as "restaurants in bellevue", "movie showtimes in kirkland, wa", and so on.

The search engine stores query logs can include the IP address of each user, and all the associated user queries. The query logs can also comprise a user identifier (UserID) (e.g., unique) for each person using the search engine. The logs can also comprise a client identifier (ClientID) corresponding to each user identifier and user device combination (UserID+Device). The ClientID can be user login information or device login information, for example. For non-login users, an anonymous ID can be created to track the user. The user geolocation in foreign country can be detected by search terms, GPS, etc., to correct for a temporary change in user location (e.g., working at a different corporate location). A user using both a mobile phone and a tablet, for example, to access the search engine receives a single UserID and two ClientIDs. Where the multiple users operate behind the same IP address, rather than using ClientIDs, identification can be on a user basis, and not an IP basis, enabling the differentiation of users behind the same IP address.

For some page views the search engines have access to the true IP address location of the user from mobile devices equipped with geolocation (geographic location) technologies (e.g., GPS) or other devices which can report the correct location.

The methods described herein use a location extraction algorithm that can extract locations mentioned in user queries, for example. For a query "weather seattle", the algorithm extracts Seattle, Wash., and returns more information about the location, including state, country, and a location identifier (ID) (e.g., unique) for the location. Queries that mention Seattle may yield the same ID.

A reverse geocoding algorithm can be utilized that when given a latitude/longitude pair returns information about the geographical entity where this pair is located, if any. Similarly, the algorithm can also return information about the state, country, and location ID of the location.

At least the city-level granularity of the RevIP databases can be improved as well as the RevIP database for fixed broadband Internet connections and mobile network ranges.

Following is a description of improving RevIP databases using at least search engine query logs.

A ground truth dataset can be generated with mappings of IPs to locations and/or IP ranges to locations which are known to be correct. IP addresses observed in the query logs on several different days, and which did not "move around the map too much" (e.g., stayed within a predefined geographical area, such as circle of a small diameter), are stored. The IP addresses that match these requirements most likely belong to fixed broadband networks.

In one implementation, processing is first restricted to only the page views where the exact location of the users are known based on user geolocation (e.g., GPS) coordinates. (This may be a small fraction of all users and page views.) Most devices which send geolocation coordinates to search engines are mobile device (e.g., cellphones, tablets, etc.) with mobile network radios. This suggests that the IP addresses of such devices can be skewed toward mobile network IP ranges. However, users that use mobile devices often also connect these devices to their home wireless networks. When the devices switch to the user's home broadband network the last known location is again sent to the search engine when the user issues queries. This in turn means that for a particular user geolocation can be assigned for both user mobile and fixed/home Internet connections.

Beginning with the page views of known geolocations, all the locations detected in the query log for each IP address are aggregated. For each IP address there is a list of geolocations of the page views. It can also be determined in how many distinct periods of time (e.g., days) each IP address is observed in the logs. Per IP address, the minimum and maximum of all geolocation information latitudes and longitudes can be computed. This can yield four values: the minimum latitude (MinLat), minimum longitude (Minton), maximum latitude (MaxLat), and maximum latitude (MaxLon). The great-circle distance (on a sphere such as the Earth) can be computed between the (MinLat, MinLon) and (MaxLat, MaxLon) points.

An alternative solution for computing distance can be to employ the Pythagorean Theorem. Since the great-circle distance imposes heavy computation due to the use of trigonometric functions, the Pythagorean Theorem can be used to find the length based on the absolute values of minimum and maximum values (e.g., abs(MinLat-MaxLat) and abs(MinLon-MaxLon)). Per IP address computation of a centroid can be obtained using the coordinates (MaxLat-MinLat, MaxLon-MinLon). All IP addresses and associated centroids observed at least X distinct days in the logs and where the distance on a sphere is less than Y miles (both X and Y integer numbers), can be retained (stored).

An alternative solution for generating ground truth dataset can be the following. As described herein, one method for determining ground truth IP addresses can be focused towards fixed (cable) broadband networks, which excludes mobile network IP addresses due to a requirement that the IP addresses stay within a diameter of Y miles. In order to include mobile networks in the ground truth data as well, the ground truth dataset problem can be relaxed.

In order to obtain granularity at the city level, the requirements can be modified such that all of the geolocations for an IP address are located in the same city. This modification enables the inclusion of mobile IP addresses within the same geographical area (in the same city).

Yet another alternative solution for generating ground truth dataset considers data sources in combination with or other than query logs. Query logs are only one source of user location ground truth data. Another source is geographical social networks. These types of social networks enable a user to "check in" when reaching certain destinations, such as a restaurant, which signals other social network users where the user is currently located. When further considering these types of social networks, the "check in" log (which contains both the IP address and the GPS location of each "check in") can be used, and/or the full location log used, as some of these websites and applications continuously track the user location.

The disclosed architecture also computes the types of queries and SERP page blocks are location-aware (targeted to the user based on the user location). Large search engines process billions of queries every month. The disclosed methods efficiently parse queries of users to find explicit locations (in the query), which on a large scale can be a significant computational burden. The methods can sample the queries in a way that maximizes the likelihood that the queries not parsed contain locations.

It is desirable to only process queries that in the past yielded page regions that are location-aware, such as weather, business listings, and movie show times, etc. To achieve this, first process a full day of query logs. Each query is processed through the location extraction algorithm to extract the location information. For each query that contains an explicit location, the types of page blocks present on the page are also extracted. The occurrences of each type of page block are counted for the queries which contained locations. Thereafter, a list (also referred to as the location-related page regions list) is generated of the top page regions which correlate with explicit location queries.

With respect to extracting locations (explicit) from user queries and aggregating most frequently used locations per IP address, first sample all page views from the query logs to match only the page views where the SERP page contained a page region which is on the location-related page regions list. Then process each query in the sample through the location extraction algorithm and retain all page views where the query contained an explicit location, along with the details about the extracted location. Per IP address, the occurrences of locations mentioned in the queries issued for that IP address are counted. For each IP address, store the top Z (where Z is an integer≥1) locations mentioned in the queries, and sorted by the number of occurrences, in descending order.

With respect to aggregating dominant locations, mapping the dominant locations to existing RevIP database IP address ranges, and determining which dominant locations to replace, RevIP databases map IP ranges to locations (e.g., ranges have a start IP address (StartIP) and an end IP address (EndIP)).

It can be hypothesized that some of these IP ranges are mapped to incorrect locations. Accordingly, in order to find which ranges have incorrect locations for correction, start from the location occurrences computed above. Then aggregate the location occurrence counts per IP address range (i.e., aggregate all location occurrences for each IP address per RevIP database IP address range). This yields the top most frequently mentioned locations in the queries issued from each IP address range in the RevIP database. For each RevIP database IP address range that matched at least one of the IP addresses above, replace the location in the RevIP database with the top location mentioned in user queries based on a threshold (e.g., if the number of mentions of that location is greater than a threshold M, where M≥1). As M is increased, precision increases and recall decreases. The modified RevIP database in this step yields better performance than the original RevIP database.

Following is an example of an alternative algorithm implementation that enables improving a RevIP database.

For each location L mentioned at least once in a particular IP address range (IPRange) R, with starting IP address StartIP and ending IP address EndIP ([StartIP, EndIP]), $$MentionsNormalized = \frac{LocalMentions^x}{GlobalMentions^y} * IPInst$$

where LocalMentions for this particular IP range R is how often the location L was mentioned; GlobalMentions is how often the location L was mentioned across all IP address ranges (not only this IP range); x and y are factors that increase or decrease the importance of LocalMentions versus GlobalMentions counts (while these factors can be variable, in one implementation, x can be 1.2 and y can be 0.5.); and, IPInst is the number of distinct IP addresses in the IPRange R that mentioned the Location L at least once.

An IP instance normalization algorithm, can be the following:

$$IPInstNorm = \frac{IPInst}{EndIP - StartIP + 1}$$

where IPInst is the number of distinct IP addresses in this IPRange that have mentioned the location; and, EndIP−StartIP+1 is the number of IP addresses in the IP range [StartIP, EndIP].

Example results for a Location L=Susner, can be the following, as presented in a table:

| | |
|---|---|
| Start IP | 16777216 |
| End IP | 16777471 |
| User Query Rev Geo City ID | City.12312330022313001032.Susner |
| Mentions | 4 |
| IP Instances | 3 |
| Global Mentions | 45 |
| Mentions Normalized | 2.3604075082695344 |
| IP Stances Normalized | 0.01171875 |

The modified (and potentially improved) RevIP database can be evaluated against ground truth dataset. For each IP address in the ground truth dataset, the corresponding IP address range (if any) is found (matched) in the given RevIP database. For each match, the location in the RevIP database is compared to the location from the ground truth dataset. Since the locations in commercial RevIP database do not necessarily have the same exact names as the locations in the ground truth dataset, before performing this comparison, the latitude/longitude from the RevIP DB and the ground truth dataset are converted to locations using the reverse geocoding algorithm.

Two of many possible metrics can include exact city ID matching and distance-based matching. With respect to exact city ID matching, divide by the number of times the RevIP database location is the same as the ground truth location over number of matches. With respect to distance-based matching, compute the distance between the coordinates of the location determined from the RevIP database to the coordinates of the location from ground truth, assign the distances for each match to a bucket given, for example, by the following formula:

floor(distance/bucketSize)*bucketSize, where floor corresponds to the mathematical floor function (a function that maps a real number to a greatest integer less than or equal to a value x), distance is the distance between the RevIP location and the ground truth location (e.g., in a chosen distance unit such as kilometers or miles), and bucketSize is the width of the bucket in the chosen distance unit (e.g., as kilometers or miles). A RevIP database improves as more distances match a bucket size with a low value, as given by the above formula. Using this method, the original RevIP database can then be compared to the modified RevIP database to determine which database is of a higher quality.

RevIP database IP address ranges can be split and/or combined to improve the overall performance of the RevIP database. With respect to aggregating dominant locations above, it can be assumed the IP address ranges in the RevIP database are correct. However, it may be the case that the IP address ranges actually contain several contiguous sub-ranges with different locations, or that multiple IP address ranges contain the same location and can be merged.

With respect to splitting IP address ranges, start from each IP address range (StartIP, EndIP) and all the IP addresses within the IP address range that match locations from user queries. Among the matching IP addresses, find sequences of IP addresses that are increasing in value (not necessarily consecutive) and that match the same top location. For each such sequence, an IP address sub-range is created. The sub-range addresses created by the remaining "address holes" are then set to have the original location of the IP address range.

With respect to merging IP address ranges, find adjacent IP address ranges with the same location. Given two IP address ranges (StartIP1, EndIP1) and (StartIP2, EndIP2), the ranges are considered adjacent, if $0 \leq StartIP2 - EndIP1 \leq R$, and the locations of the IP address ranges are the same, where R is an integer threshold. The IP address ranges are then merged, if the IP address ranges are adjacent and have the same location.

An alternative solution for improving the RevIP database can be the following. Rather than focusing on improving RevIP databases at an IP level, the RevIP database can be improved at a UserID and ClientID level as well. By aggregating locations indicated in the queries by UserID and/or ClientID, location profiles can be generated for each user or for each of the use devices. The location profile can then be used to override the locations determined by the RevIP database on a per-user basis. Improving location detection on a UserID and ClientID level can help in cases where many users share the same IP address. For example, this can apply to large companies or mobile phone operators that make use of a limited number of public IP addresses. In extreme cases, there are whole countries that are behind a proxy server, which only has a single public IP address.

With respect to finding IP addresses that share multiple locations (indicative of large Internet gateways), there are cases when users located in different geographical areas share the same IP address. The disclosed architecture can determine the IP addresses that serve more than one geographical region. This can be achieved in the step above related to extracting locations from user queries and aggregating most often used locations per IP.

Rather than keeping only the top Z locations, take into consideration all locations per IP address. If the number of distinct number of geographical regions is above a threshold D, and if on average every region is mentioned at least R times (where values D and R are integers), determine if the IP address is used by several users in multiple geographical regions.

Additionally, other signals can be utilized to determine user diversity: the number of distinct users who have signed-in from this IP address with a username/password, and the number of queries issued, on average, from the IP address, compared to the average across all IP addresses.

The existence of IP addresses that share multiple locations suggests the possibility of employing a hybrid approach that uses an improved IP-level RevIP database for countries and/or geographical regions with a large number of distinct IP addresses, and uses location detection at the UserID and ClientID level for regions with a limited number of IP addresses shared by many users.

Reference is now made to the drawings, wherein like reference numerals are used to refer to like elements throughout. In the following description, for purposes of explanation, numerous specific details are set forth in order to provide a thorough understanding thereof. It may be evident, however, that the novel implementations can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a database update system 100 in accordance with the disclosed architecture. The system 100 can include an access component 102 configured to access geographic location data 104 (e.g., geolocation coordinate data (latitude/longitude), location-aware content of a webpage, etc.) indicative of a user geographic location 106 as derived from user actions 108 (e.g., enabling device geolocation tracking, explicitly inputting user location data, enabling the capture of check-in data from a social network, etc.) relative to the geographic location 106.

The access component 102 can access search engine query logs, for example, to obtain the geographic location data 104 from the logs for the given user or of other users. The access component 102 can be configured to determine that at least one of the queries or content which contain location information, and configured to extract location data from user queries.

An aggregation component 110 is provided and configured to aggregate most-frequently-used ("dominant") location data 112 per network address (e.g., IP). The dominant locations are mapped to existing RevIP database IP address ranges, and determining which dominant locations to replace, RevIP databases map IP ranges to locations (e.g., ranges have a start IP address (StartIP) and an end IP address (EndIP)).

Since some of these IP ranges may be mapped to incorrect locations, in order to find which ranges have incorrect locations for correction, start from the location occurrences computed above. The location occurrence counts are aggregated per IP address range (i.e., aggregate all location occurrences for each IP address per RevIP database IP address range). This yields the top most-frequently mentioned locations in the queries issued from each IP address range in the RevIP database. For each RevIP database IP address range that matched at least one of the IP addresses above, replace the location in the RevIP database with the top location mentioned in user queries based on a threshold (e.g., if the number of mentions of that location is greater than a threshold M, where M≥1). As M is increased, precision increases and recall decreases. The modified RevIP database in this step yields better performance than the original RevIP database.

An update component 114 is provided and configured to update an existing reverse IP (Internet protocol) database with updates to create the updated reverse IP database 116 for use with at least one of a broadband network or a mobile network based on the most-frequently-used location data 112. The update component 114 can be configured to at least one of split or combine IP address ranges to improve performance of the (previous) reverse IP database as an improvement to the updated RevIP database 116.

Figure 2:
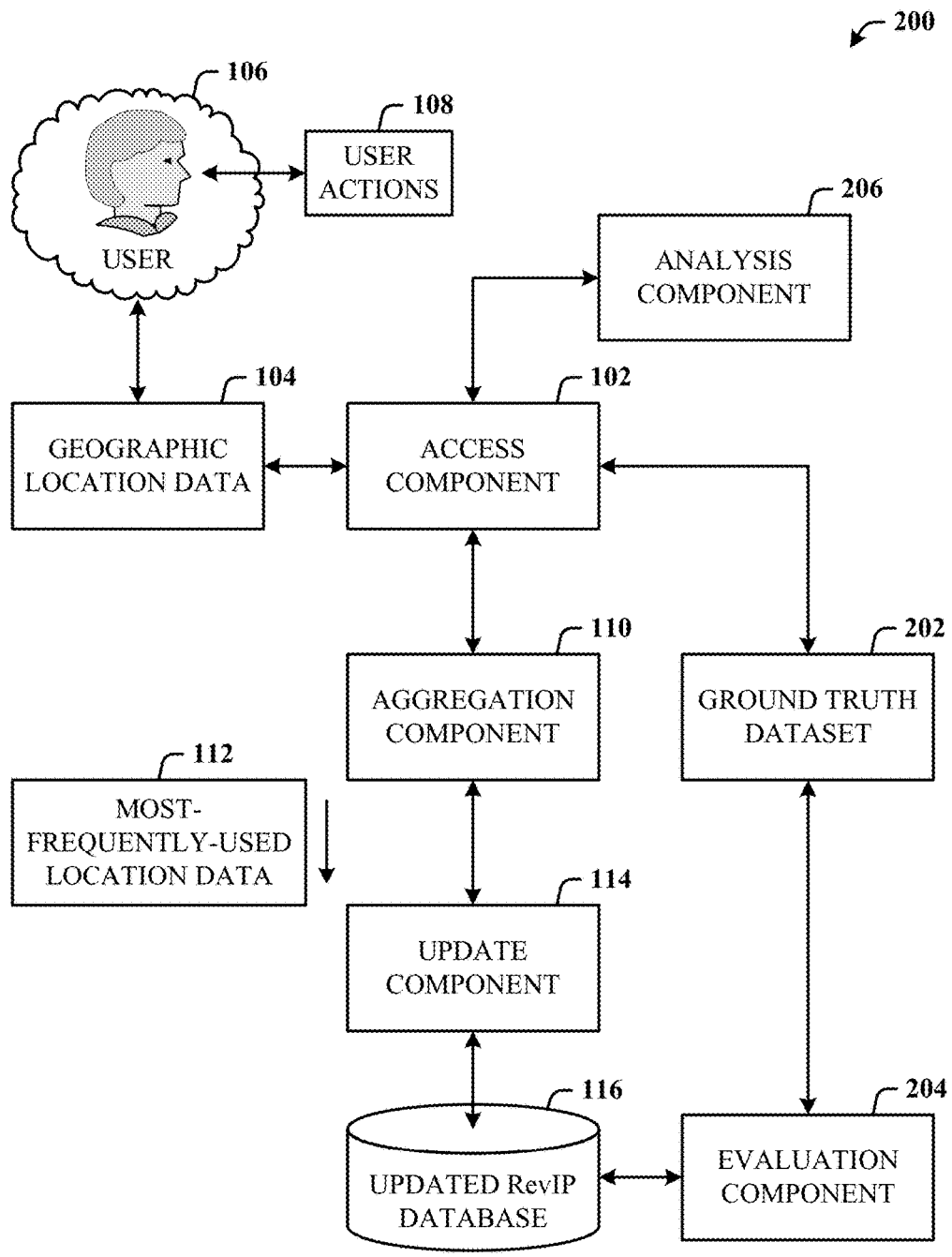
FIG. 2 illustrates an alternative database update system in accordance with the disclosed architecture.

FIG. 2 illustrates an alternative database update system 200 in accordance with the disclosed architecture. The system includes the system 100 of FIG. 1, and in addition, other components: a ground truth dataset 202, an evaluation component 204, and an analysis component 206. The ground truth dataset 202 is generated and configured to map IP addresses and IP address ranges to geographic locations to enable testing (e.g., using a threshold) of the updated reverse IP database for improvement. The evaluation component 204 is configured to evaluate the updated reverse IP database 116 using the ground truth dataset 202 to ensure the updated reverse IP database is an improvement over the (previous) reverse IP database. The analysis component 206 can be configured to identify IP addresses that share multiple geographic locations.

It is within contemplation of the disclosed architecture that RevIP database evaluation is not a requirement. In other words, it can be assumed that the updated RevIP database is an improvement without evaluation, and thus, deployed to replace the prior (or existing) RevIP database. The RevIP database can include city, state, country, city limits (boundary marks), continents, time zones, etc., all related to the geographical context of the user (and user device). It can be the case where a decision can be that the existing RevIP database data is "stable" (sufficiently up-to-date) and does not need to be updated until another cycle, for example.

Evaluation can employ different thresholds can be applied for different purposes. For example, evaluation can be focused on entities such as continents, countries, smaller regions, etc. Some entities may not update the database while other countries may update the database.

In another implementation, two cities in relative close proximity could cause conflicts in search; for example, the user lives or works in Bellevue, yet frequently searches Seattle. In such cases, an algorithm can be employed to consider city size. Thus, if the user searches Seattle twenty times and Bellevue fifteen times, the Bellevue results are boosted (e.g., more heavily weighted or ranked) because of the user location in Bellevue. This compensates for the big-city/small-city scenario.

It is to be understood that in the disclosed architecture, certain components may be rearranged, combined, omitted, and additional components may be included. Additionally, in some implementations, all or some of the components are present on the client, while in other implementations some components may reside on a server or are provided by a local or remote service.

Figure 3:
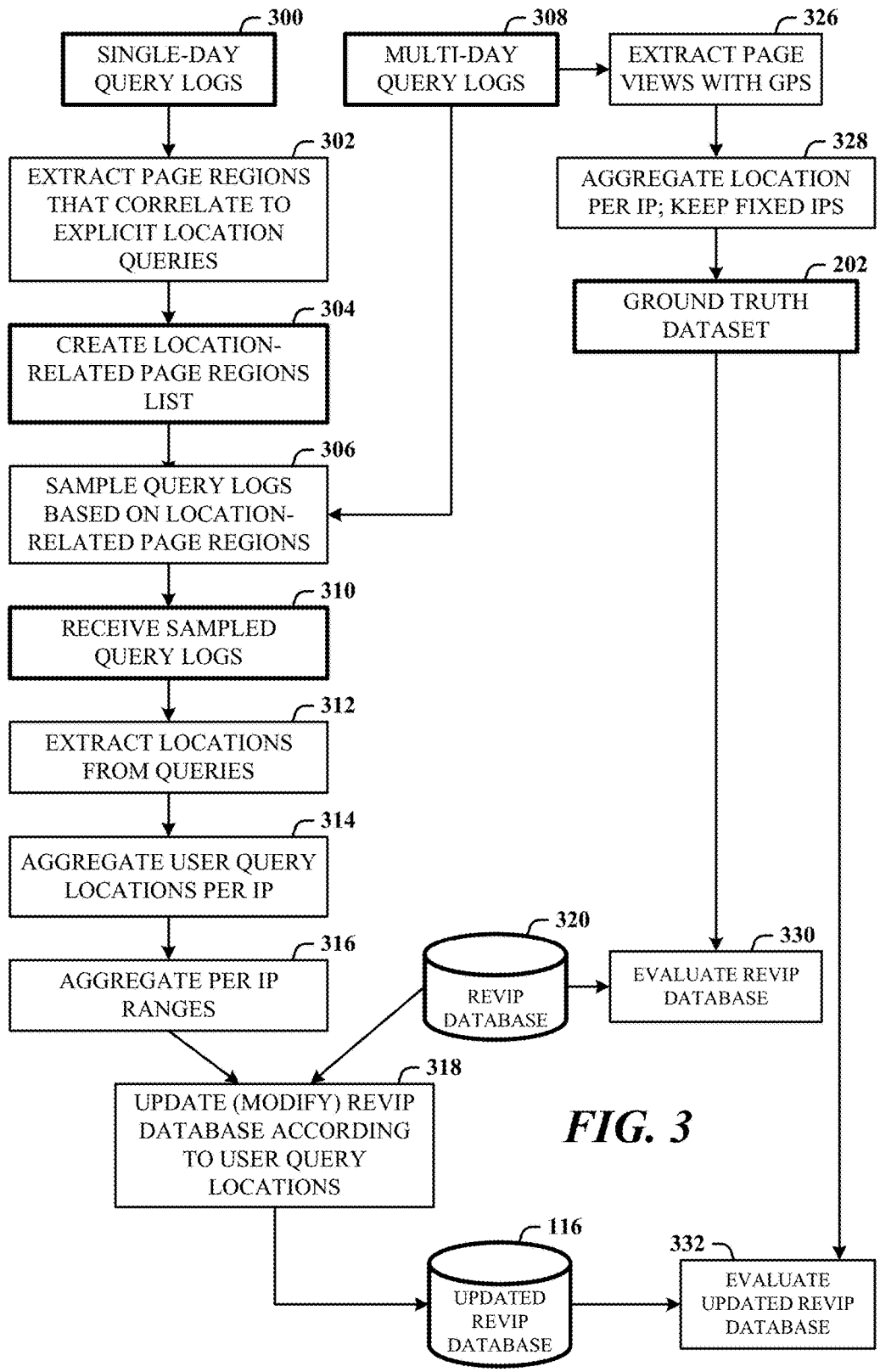
FIG. 3 illustrates a diagram for database update in accordance with the disclosed architecture.

FIG. 3 illustrates a diagram 300 for database update in accordance with the disclosed architecture. While specifically focused in this implementation to accessing and examining search engine query logs, it is to be understood that the diagram applies generally as well to other sources of user location information.

Operating on single-day query logs, at 300, flow is to 302 where page regions (e.g., targeted advertisements that relate to a geographical area, other forms of media associated with the user or geographical location of the user/device, etc.) are extracted that correlate to explicit location queries. Explicit location queries explicitly use location data or terms in the query. Thus, content sent and presented in page regions (sections) to the user in a page view will likely be content associated with the location data explicitly used in the query. At 304, a list is created of locations-related page regions. At 306, query logs are sampled based on the location-related page regions. While this can be performed on the single-day query logs, this can also be performed on multi-day query logs 308. The multiple days can be any predetermined number of days such as three days, for example.

After sampling single-day and/or multi-day query logs, at 306, flow can be to 310 receive (or obtain) the sampled query logs. At 312, locations (geographic information) are extracted from the associated queries in the sampled query logs. At 314, the user query locations extracts from the queries, are aggregated by IP address. At 316, aggregation is then performed on an IP address range basis. At 318, the previous RevIP database 320 is then updated (modified) according to the extracted and aggregated user query locations, resulting in the updated RevIP database 116. In one implementation, this can complete the RevIP update process.

However, further enhancements can be made to ensure the updated RevIP database 116 is actually an improvement over the previous version of RevIP database 320. In support thereof, the ground truth dataset 202 is employed. The dataset 202 can be generated using at least extracted location-aware page views 326 associated with some geolocation technology, such as GPS. The location-aware page views 326 can be obtained from the multi-day query logs 308, for example. At 328, the locations obtained from location-aware page views 326 can then be aggregated on a per IP address basis, keeping the fixed IP addresses (associated with broadband connections). The dataset 202 then uses at least this information for analysis of the RevIP database for some level of improvement (or lack thereof).

The ground truth dataset 202 is then used to evaluate the previous RevIP database 320, as indicated at 330, and the updated RevIP database 202, as indicated at 332. This can be a differential analysis process between the databases (116 and 320) to see or assess the changes made to the updated database 116 relative to the previous database 320.

Alternatively, this can be a direct analysis of both the databases (116 and 320) against one or more metrics and from which scores can be output as a measure of usefulness or improvement. For example, it can be the case that the updated database 116 is of no improvement or a miniscule improvement such that it is not worth the cost in resources, as one measure, to deploy the updated database 116; thus, the previous database 320 is kept in service (remains deployed) until such time the updated database 116 is deemed of a significant benefit to deploy.

The disclosed architecture can optionally include a privacy component that enables the user to opt in or opt out of exposing personal information. The privacy component enables the authorized and secure handling of user information, such as tracking information, as well as personal information that may have been obtained, is maintained, and/or is accessible. The user can be provided with notice of the collection of portions of the personal information and the opportunity to opt-in or opt-out of the collection process. Consent can take several forms. Opt-in consent can impose on the user to take an affirmative action before the data is collected. Alternatively, opt-out consent can impose on the user to take an affirmative action to prevent the collection of data before that data is collected.

Figure 4:
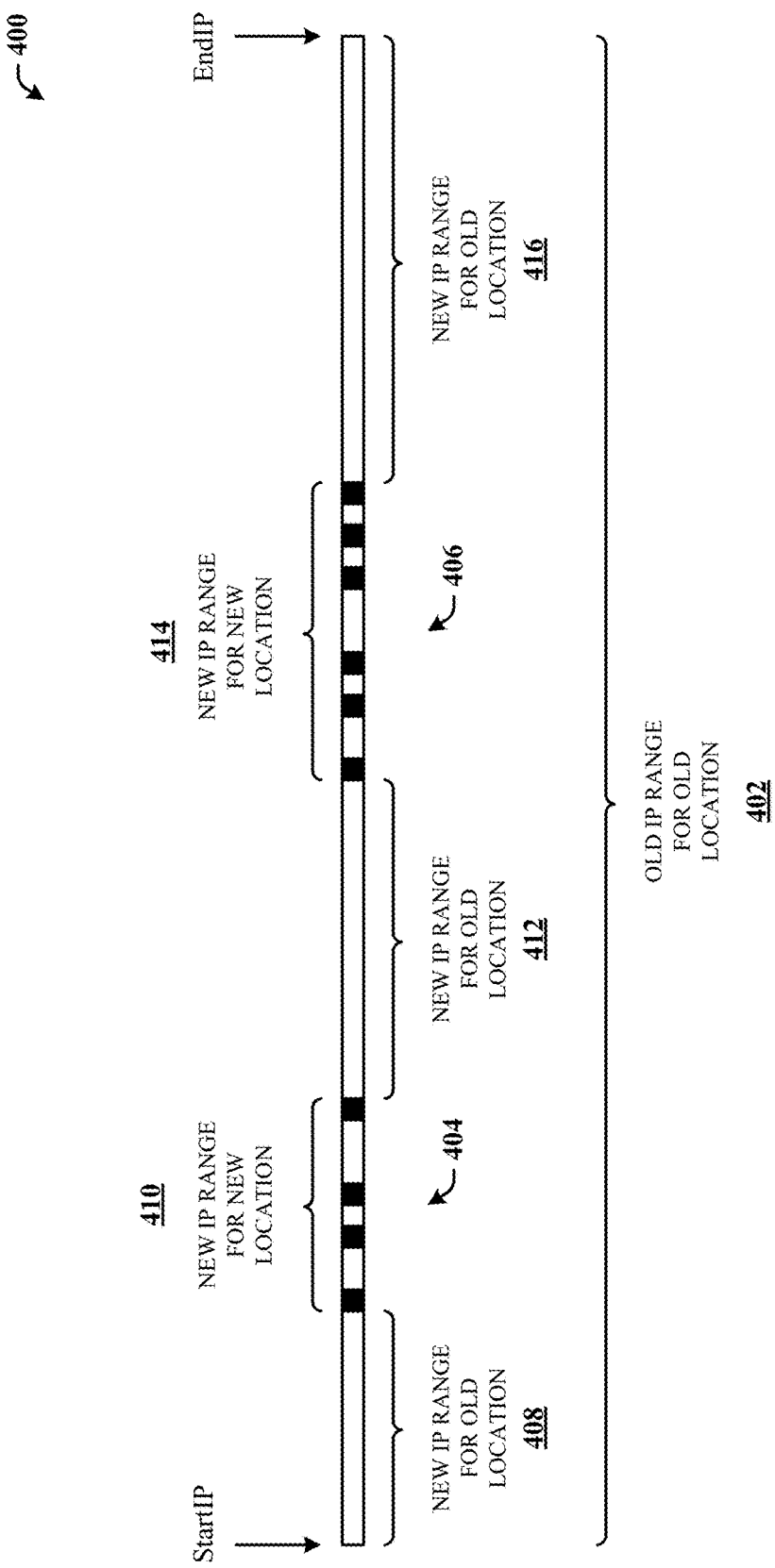
FIG. 4 illustrates a visual representation of splitting an old IP address range in accordance with an improved reverse IP database.

FIG. 4 illustrates a visual representation 400 of splitting an old IP address range 402 in accordance with an improved reverse IP database. The old IP address range 402 is indicated as having a StartIP address and an EndIP address, and is an IP address range established for an "old IP range for an old location" in a reverse IP database. The disclosed architecture has detected ten new IP addresses within the old IP address range 402 based on geographical location data: four IP addresses 404 clustered near the StartIP address and six IP addresses 406 clustered near the EndIP address.

Accordingly, to improve the accuracy (quality) of the RevIP database, an update process (of the update component 114) splits the old IP address range 402 into five segments: a first new IP address range 408 for the old location, a first new IP address range 410 for a new location (the four IP addresses 404), a second new IP address range 412 for the old location, a second new IP address range 414 for a new location (the six IP addresses 406), and a third new IP address range 416 for the old location. As described herein, two IP address ranges can be combined (merged) when the two ranges are adjacent and for the same geographical location.

In operation, is can be assumed the entire IP address range was assigned to city, such as Seattle; however, based on the update process it is determined that in the range there is a sub-range of IP addresses that are associated with a second city, such as for Bellevue. To improve on the quality (or accuracy) of the database, the entire range is split to more accurately account for Bellevue addresses.

It is to be appreciated that while in one implementation, the updated RevIP database can reside in the network, in another implementation, the database can be slimmed down in size and more focused to a user and or location such that the database can be pushed to a user device for utilization.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
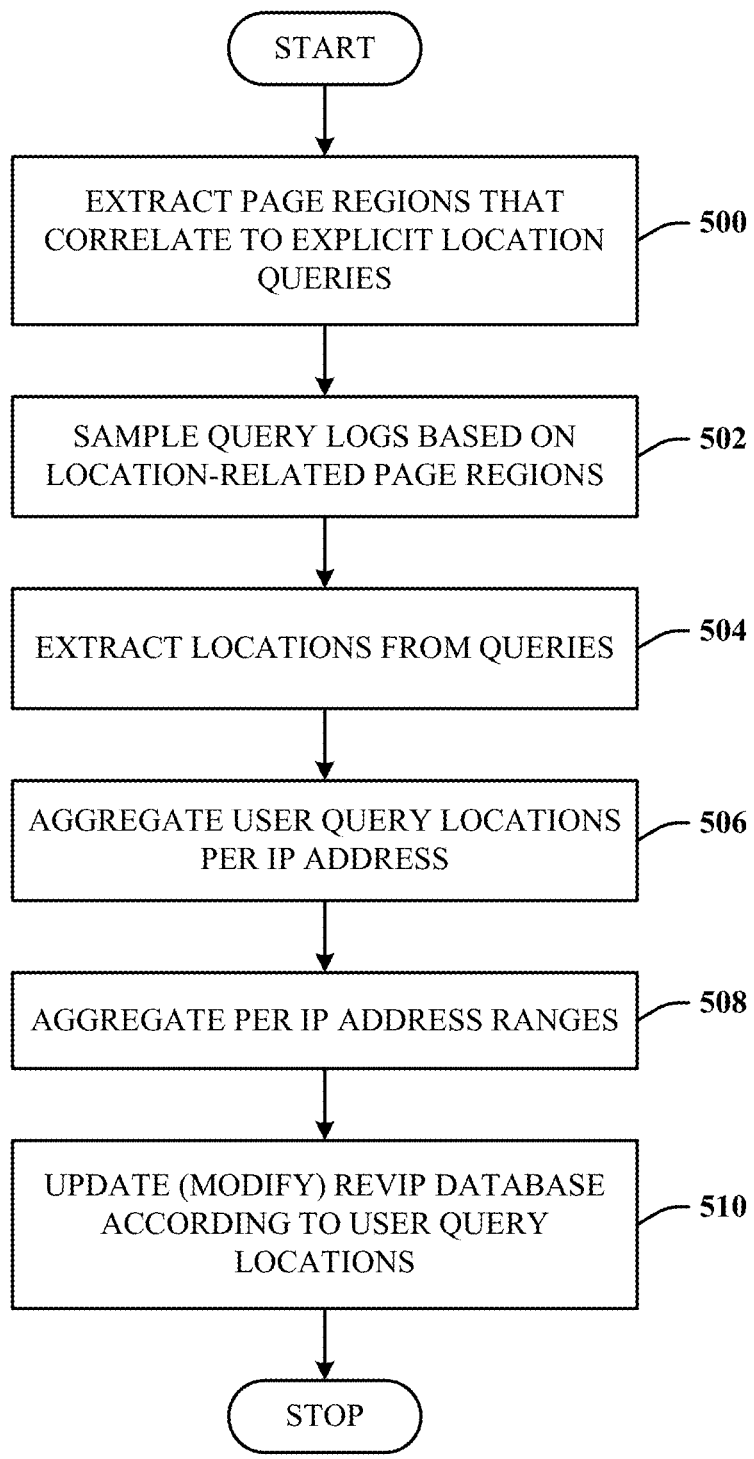
FIG. 5 illustrates a method in accordance with the disclosed architecture.

FIG. 5 illustrates a method in accordance with the disclosed architecture. The method corresponds to the accessing of search engine query logs. At 500, page regions (or sections) that correlate to explicit location queries, are extracted. At 502, the query logs are sampled based on location-related (or aware) page regions. At 504, locations (geographic) are then extracted from the queries. At 506, user query locations are then aggregated per IP address. At 508, the user query locations are then aggregated on per IP address ranges. At 510, the RevIP database is then updated (modified) according to the user query locations.

Figure 6:
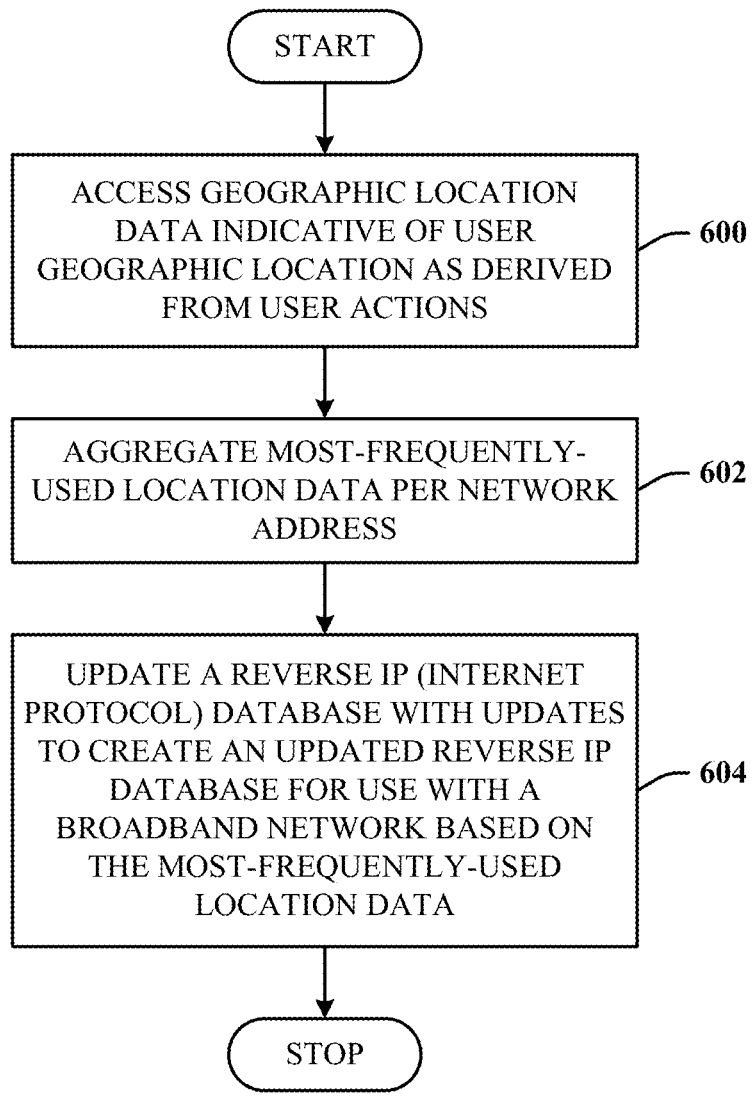
FIG. 6 illustrates yet another method in accordance with the disclosed architecture.

FIG. 6 illustrates yet another method in accordance with the disclosed architecture. At 600, geographic location data indicative of user geographic location is accessed as derived from user actions. The user actions can include, but are not limited to, clicking on content of a web page, inserting geographic location information in the query, carrying the user device into a geographical area, and so on. At 602, most-frequently-used location data is aggregated on a per network address basis. At 604, a reverse IP database is updated with updates to create an updated reverse IP database for use with a broadband network (fixed cable) based on the most-frequently-used location data.

The method can further comprise evaluating the updated reverse IP database using a ground truth dataset to ensure the updated reverse IP database is an improvement over the reverse IP database. The method can further comprise accessing the geographic location data as relate to a search query.

The method can further comprise accessing the geographic location data as relate to a content section of a search results page. The method can further comprise determining what types of webpage content is location aware content.

The method can further comprise splitting an IP address range as part of the updates to improve the updated reverse IP database. The method can further comprise combining IP addresses as part of the updates to improve the updated reverse IP database.

Figure 7:
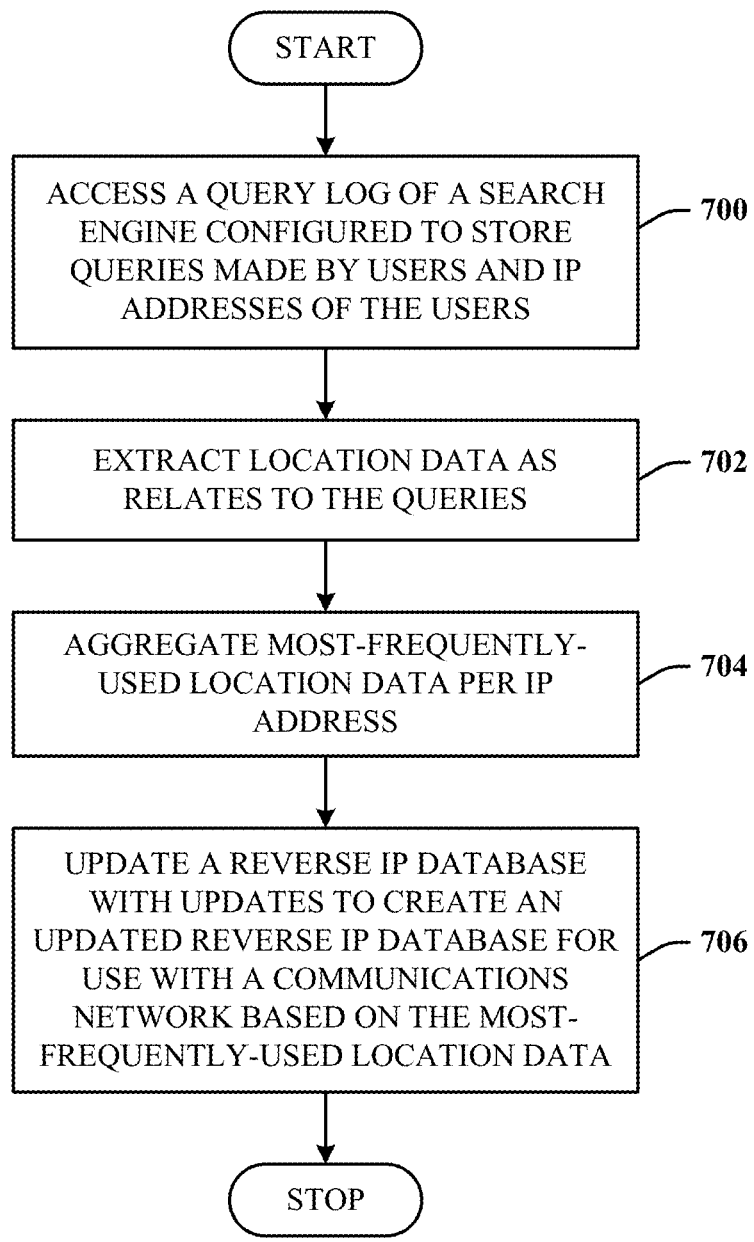
FIG. 7 illustrates still another method in accordance with the disclosed architecture.

FIG. 7 illustrates still another method in accordance with the disclosed architecture. The method can be implemented as computer-readable storage medium comprising computer-executable instructions that when executed by a hardware processor enable updating a database.

At 700, a query log of a search engine configured to store queries made by users and IP addresses of the users, is accessed. At 702, location data as relates to the queries, are extracted. At 704, most-frequently-used location data is aggregated on a per IP address basis. At 706, a reverse IP database is updated with updates to create an updated reverse IP database for use with a communications network based on the most-frequently-used location data.

The computer-readable storage medium can further comprise utilizing the updated reverse IP database with at least one of a broadband communications network or a mobile communications network. The computer-readable storage medium can further comprise at least one of splitting an IP address range or combining IP addresses as part of updating the reverse IP database.

The computer-readable storage medium can further comprise evaluating the updated reverse IP database against a ground truth dataset. The computer-readable storage medium can further comprise determining which types of queries and webpage content sections are location-aware queries and content sections. The computer-readable storage medium can further comprise mapping the most-frequently-used location data to existing reverse IP database ranges.

As used in this application, the terms "component" and "system" are intended to refer to a computer-related entity, either hardware, a combination of software and tangible hardware, software, or software in execution. For example, a component can be, but is not limited to, tangible components such as a microprocessor, chip memory, mass storage devices (e.g., optical drives, solid state drives, and/or magnetic storage media drives), and computers, and software components such as a process running on a microprocessor, an object, an executable, a data structure (stored in a volatile or a non-volatile storage medium), a module, a thread of execution, and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 8:
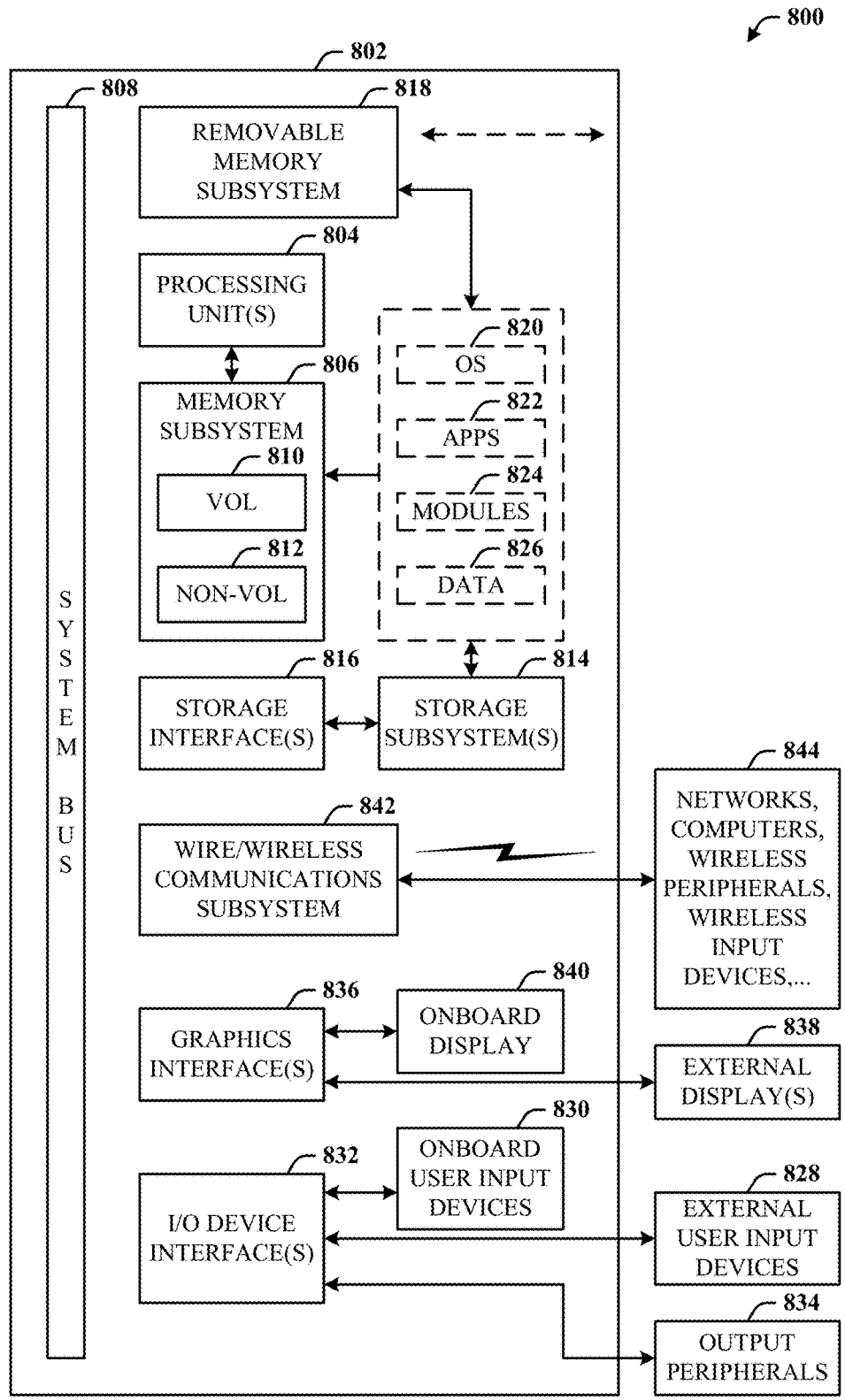
FIG. 8 illustrates a block diagram of a computing system that executes database update in accordance with the disclosed architecture.

Referring now to FIG. 8, there is illustrated a block diagram of a computing system 800 that executes database update in accordance with the disclosed architecture. However, it is appreciated that the some or all aspects of the disclosed methods and/or systems can be implemented as a system-on-a-chip, where analog, digital, mixed signals, and other functions are fabricated on a single chip substrate.

In order to provide additional context for various aspects thereof, FIG. 8 and the following description are intended to provide a brief, general description of the suitable computing system 800 in which the various aspects can be implemented. While the description above is in the general context of computer-executable instructions that can run on one or more computers, those skilled in the art will recognize that a novel implementation also can be realized in combination with other program modules and/or as a combination of hardware and software.

The computing system 800 for implementing various aspects includes the computer 802 having microprocessing unit(s) 804 (also referred to as microprocessor(s) and processor(s)), a computer-readable storage medium such as a system memory 806 (computer readable storage medium/media also include magnetic disks, optical disks, solid state drives, external memory systems, and flash memory drives), and a system bus 808. The microprocessing unit(s) 804 can be any of various commercially available microprocessors such as single-processor, multi-processor, single-core units and multi-core units of processing and/or storage circuits. Moreover, those skilled in the art will appreciate that the novel system and methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 802 can be one of several computers employed in a datacenter and/or computing resources (hardware and/or software) in support of cloud computing services for portable and/or mobile computing systems such as wireless communications devices, cellular telephones, and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 806 can include computer-readable storage (physical storage) medium such as a volatile (VOL) memory 810 (e.g., random access memory (RAM)) and a non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the system memory 806 to the microprocessing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes machine readable storage subsystem(s) 814 and storage interface(s) 816 for interfacing the storage subsystem(s) 814 to the system bus 808 and other desired computer components and circuits. The storage subsystem(s) 814 (physical storage media) can include one or more of a hard disk drive (HDD), a magnetic floppy disk drive (FDD), solid state drive (SSD), flash drives, and/or optical disk storage drive (e.g., a CD-ROM drive DVD drive), for example. The storage interface(s) 816 can include interface technologies such as EIDE, ATA, SATA, and IEEE 1394, for example.

One or more programs and data can be stored in the memory subsystem 806, a machine readable and removable memory subsystem 818 (e.g., flash drive form factor technology), and/or the storage subsystem(s) 814 (e.g., optical, magnetic, solid state), including an operating system 820, one or more application programs 822, other program modules 824, and program data 826.

The operating system 820, one or more application programs 822, other program modules 824, and/or program data 826 can include items and components of the system 100 of FIG. 1, items and components of the system 200 of FIG. 2, items and flow of the diagram 300 of FIG. 3, items of the system 400 of FIG. 4, and the methods represented by the flowcharts of FIGS. 5-7, for example.

Generally, programs include routines, methods, data structures, other software components, etc., that perform particular tasks, functions, or implement particular abstract data types. All or portions of the operating system 820, applications 822, modules 824, and/or data 826 can also be cached in memory such as the volatile memory 810 and/or non-volatile memory, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so on. Such instructions, when executed by a computer or other machine, can cause the computer or other machine to perform one or more acts of a method. Computer-executable instructions comprise, for example, instructions and data which cause a general purpose computer, special purpose computer, or special purpose microprocessor device(s) to perform a certain function or group of functions. The computer executable instructions may be, for example, binaries, intermediate format instructions such as assembly language, or even source code. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) exclude (excludes) propagated signals per se, can be accessed by the computer 802, and include volatile and non-volatile internal and/or external media that is removable and/or non-removable. For the computer 802, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 802, programs, and data using external user input devices 828 such as a keyboard and a mouse, as well as by voice commands facilitated by speech recognition. Other external user input devices 828 can include a microphone, an IR (infrared) remote control, a joystick, a game pad, camera recognition systems, a stylus pen, touch screen, gesture systems (e.g., eye movement, body poses such as relate to hand(s), finger(s), arm(s), head, etc.), and the like. The user can interact with the computer 802, programs, and data using onboard user input devices 830 such a touchpad, microphone, keyboard, etc., where the computer 802 is a portable computer, for example.

These and other input devices are connected to the microprocessing unit(s) 804 through input/output (I/O) device interface(s) 832 via the system bus 808, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 832 also facilitate the use of output peripherals 834 such as printers, audio devices, camera devices, and so on, such as a sound card and/or onboard audio processing capability.

One or more graphics interface(s) 836 (also commonly referred to as a graphics processing unit (GPU)) provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP-based) using logical connections via a wired/wireless communications subsystem 842 to one or more networks and/or other computers. The other computers can include workstations, servers, routers, personal computers, microprocessor-based entertainment appliances, peer devices or other common network nodes, and typically include many or all of the elements described relative to the computer 802. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 802 connects to the network via a wired/wireless communication subsystem 842 (e.g., a network interface adapter, onboard transceiver subsystem, etc.) to communicate with wired/wireless networks, wired/wireless printers, wired/wireless input devices 844, and so on. The computer 802 can include a modem or other means for establishing communications over the network. In a networked environment, programs and data relative to the computer 802 can be stored in the remote memory/storage device, as is associated with a distributed system. It will be appreciated that the network connections shown are exemplary and other means of establishing a communications link between the computers can be used.

The computer 802 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of updating a database, comprising:
accessing geographic location data indicative of user geographic location as derived from user actions;
aggregating most-frequently-used location data per network address into aggregated database updates;

updating an existing reverse IP (Internet protocol) database with the aggregated database updates to create an updated reverse IP database based on the most-frequently-used location data;

evaluating the updated reverse IP database against a ground-truth database to determine an accuracy of the updated reverse IP database for a particular range of IP addresses;

determining, based on the evaluating, whether the updated reverse IP database is more accurate for the particular range of IP addresses than the existing reverse IP database; and only upon determining that the updated reverse IP database is at least a predetermined amount more accurate for the particular range of IP addresses than the existing reverse IP database, using the updated reverse IP database to determine a geographic location for particular range of IP addresses.

2. The method of claim 1, further comprising accessing the geographic location data related to a search query.

3. The method of claim 1, further comprising accessing the geographic location data related to a content section of a search results page.

4. The method of claim 1, further comprising determining what types of webpage content is location aware content.

5. The method of claim 1, further comprising splitting an IP address range as part of the updates to create the updated reverse IP database.

6. The method of claim 1, further comprising combining IP addresses as part of the updates to create the updated reverse IP database.

7. A computer-readable hardware storage medium comprising computer-executable instructions that when executed by a hardware processor enable updating a database, cause the processor to perform acts of:

accessing a query log of a search engine configured to store queries made by users and IP addresses of the users;

extracting location data related to the queries;

aggregating most-frequently-used location data per IP address;

updating an existing reverse IP database with updates to create an updated reverse IP database for use with a communications network based on the most-frequently-used location data;

evaluating the updated reverse IP database against a ground-truth database to determine an accuracy of the updated reverse IP database for a particular range of IP addresses;

determining, based on the evaluating, whether the updated reverse IP database is more accurate for the particular range of IP addresses than the existing reverse IP database; and only upon determining that the updated reverse IP database is at least a predetermined amount more accurate for the particular range of IP addresses than the existing reverse IP database, using the updated reverse IP database to determine a geographic location for particular range of IP addresses.

8. The computer-readable hardware storage medium of claim 7, further comprising utilizing the updated reverse IP database with at least one of a broadband communications network or a mobile communications network.

9. The computer-readable hardware storage medium of claim 7, further comprising at least one of splitting an IP address range or combining IP addresses as part of updating the reverse IP database.

10. The computer-readable hardware storage medium of claim 7, further comprising determining which types of queries and webpage content sections are location-aware queries and content sections.

11. The computer-readable hardware storage medium of claim 7, further comprising mapping the most-frequently-used location data to existing reverse IP database ranges.

12. A system for updating a database, comprising:

at least one processor;

memory, operatively connected to the at least on processor, and storing instructions that, when executed by the at least one processor, cause the at least one processor to perform a method, the method comprising:

accessing geographic location data indicative of user geographic location as derived from user actions;

aggregating most-frequently-used location data per network address into aggregated database updates;

updating an existing reverse IP (Internet protocol) database with the aggregated database updates to create an updated reverse IP database based on the most-frequently-used location data;

evaluating the updated reverse IP database against a ground-truth database to determine an accuracy of the updated reverse IP database for a particular range of IP addresses;

determining, based on the evaluating, whether the updated reverse IP database is more accurate for the particular range of IP addresses than the existing reverse IP database; and only upon determining that the updated reverse IP database is at least a predetermined amount more accurate for the particular range of IP addresses than the existing reverse IP database, using the updated reverse IP database to determine a geographic location for particular range of IP addresses.

13. The system of claim 12, the method further comprising accessing the geographic location data related to a search query.

14. The system of claim 12, the method further comprising accessing the geographic location data related to a content section of a search results page.

15. The system of claim 12, the method further comprising determining what types of webpage content is location aware content.

16. The system of claim 12, the method further comprising splitting an IP address range as part of the updates to create the updated reverse IP database.

17. The system of claim 12, the method further comprising combining IP addresses as part of the updates to create the updated reverse IP database.

* * * * *